United States Patent [19]
Palm et al.

[11] Patent Number: 5,316,748
[45] Date of Patent: * May 31, 1994

[54] PHOSPHORIC ACID MANUFACTURING WITH CONVERTED WATERS

[76] Inventors: Gordon F. Palm; R. George Hartig, both of 2729 Oakland Ave., Lakeland, Fla. 33803

[*] Notice: The portion of the term of this patent subsequent to Dec. 15, 2009 has been disclaimed.

[21] Appl. No.: 990,052

[22] Filed: Dec. 14, 1992

Related U.S. Application Data

[63] Continuation-in-part of Ser. No. 727,606, Jul. 9, 1991, abandoned, and a continuation-in-part of Ser. No. 782,989, Oct. 28, 1991, and a continuation-in-part of Ser. No. 669,643, Mar. 14, 1991, Pat. No. 5,171,452.

[51] Int. Cl.$^5$ ............................ C01B 25/16; C02F 1/52
[52] U.S. Cl. .................................... 423/320; 210/710
[58] Field of Search ......................... 423/320; 210/710

[56] References Cited

U.S. PATENT DOCUMENTS

| | | | |
|---|---|---|---|
| 3,859,423 | 1/1975 | Hartig | 423/320 |
| 4,402,923 | 9/1983 | Lang | 423/320 |
| 5,084,261 | 1/1992 | Caesar | 423/319 |
| 5,171,452 | 12/1992 | Palm et al. | 210/710 |

Primary Examiner—Gregory A. Heller
Attorney, Agent, or Firm—Charles A. McClure

[57] ABSTRACT

Generation, use, and treatment of new and unique process waters in or for wet-process phosphoric acid manufacturing to substantially eliminate discharge of contaminants to the environment. Acid pond water from conventional wet-process phosphoric acid manufacturing, contaminated with compositions containing fluorine, heavy metals, and radioactive elements such as radium-226, plus residual $P_2O_5$, is superseded. Substantially all contaminants from the wet-process are insolubilized and removed, whereas $P_2O_5$ normally lost is recovered. Decontaminated gypsum stack water with a mildly acidic pH results from stepwise raising of wastewater pH, with clarification, and subsequent re-acidification, to provide a decontaminated process water with slightly acidic pH adapted to match the pH of environmental ground water. The process is made more economical, while enhancing protection of surrounding air, soil, and water from contaminants.

20 Claims, 7 Drawing Sheets

LEGEND

| DESCRIPTION | SYMBOL | pH LEVEL |
|---|---|---|
| SULFURIC ACID | | VERY ACIDIC |
| ACID PROCESS WATER | | EG. 1.5–2.0 |
| SCRUBBER PROCESS WATER | | |
| FILTER WASH EFFLUENT | | |
| GYPSUM SLURRY | | |
| PARTLY NEUTD. SCRUBBER WATER | | |
| PARTLY NEUTD. SCRUBBER WATER UNDERFLOW | | MODERATELY ACIDIC |
| PARTLY NEUTD. GYPSUM SLURRY | | EG. 3.5–4.5 |
| FLOCCULENT | | |
| LIMESTONE | | |
| LIMESTONE SLURRY | | |
| GYPSUM STACK WATER | | |
| pH-ADJUSTED WATER | | SLIGHTLY ACIDIC EG. 6 |
| FRESH WATER & WATER VAPOR | | NEUTRAL |
| COOLING WATER | | EG. 7 |
| STEAM | | |
| OVER-NEUTD. GYPSUM STACK WATER | | |
| OVER-NEUTD. GYPSUM STACK WATER UNDERFLOW | | VERY ALKALINE |
| LIME | | EG. 11 |
| LIME SLURRY | | |

*FIG. 6*

PHOSPHORIC ACID MANUFACTURING WITH CONVERTED WATERS

This application is a continuation-in-part of our patent application Ser. No. 727,606, filed 9 July 1991 and now abandoned; and a continuation-in-part of our applications Ser. No. 782,989, filed 28 October 1991, and now pending, and Ser. No. 669,643 filed 14 March 1991, and now U.S. Pat. No. 5,171,452.

TECHNICAL FIELD

This invention relates to the generation, use, and treatment of wet-process phosphoric acid process waters, including substantially contaminant-free gypsum stack water superseding contaminated gypsum pond water, to minimize environmental disturbance and product loss.

BACKGROUND OF THE INVENTION

Wet-process manufacturing of phosphoric acid is so standardized that its procedures are well known and are described as conventional in authoritative texts. An accepted reputable authority upon this subject is Pierre Becker, PHOSPHATES AND PHOSPHORIC ACID—Raw Materials, Technology, and Economics of the Wet Process, published by Marcel Dekker, Inc. (New York, 1983). Of particular interest is chapter 9 thereof, entitled "What to Do with Gypsum" (pp. 471-496). The present inventors consider Becker's identified treatise as the authority on conventional wet-process phosphoric acid practice, from which the present invention departs as described below.

Such conventional processing produces by-product gypsum stacks from which very acidic water drains into extensive cooling ponds, often measuring several hundred acres each. Conventional gyp[sum] pond water is extremely acid, usually having a pH of about 1.8-2.0, and is composed of weak phosphoric acid, as in a range from 1.3-2.5% $P_2O_5$, fluosilicic acid and soluble fluorides ranging from 0.5-1.8%, sulfuric acid and soluble sulfates ranging from 0.5-1.6%, plus soluble metal salts and radioactive compositions. It retains in solution—and therefore pollutes ground water with—residual phosphoric acid and soluble fluorides, dissolved metal impurities and radioactive compounds, and it emits fluoride-containing gases, all derived from conventional wet-process phosphoric acid manufacturing.

Attempts to limit resulting air, water, and soil contamination have had limited degrees of success. Even those inventors who have wrestled with the problem have undertaken to ameliorate one or another bad aspect thereof instead of attacking pond waters head-on.

Randolph in U.S. Pat. No. 3,625,648 proposed a rather diffuse range of neutralization of acidic gypsum pond waters effective to reduce some contaminants by precipitation. The present inventors undertook to reduce fluoride contamination, Palm as in U.S. Pat. No. 3,699,212 and Hartig as in U.S. Pat. No. 3,720,757, and jointly they subsequently developed a two-stage neutralization of recirculated acid waters, as in U.S. Pat. No. 4,320,012.

Other examples of ameliorative efforts include treating gypsum pond waters to remove metallic ions as in Mills U.S. Pat. No. 4,303,532; to recover calcium fluoride as in Hirka & Mills U.S. Pat. No. 4,171,342 or O'-Neill U.S. Pat. No. 4,374,810; or to remove calcium fluoride so as to provide a reduced fluoride solution for use in wet ball-milling of phosphate rock as in O'Neill et al. in U.S. Pat. No. 4,472,368. Hirko et al. U.S. Pat. No. 4,171,342; Zibrida in U.S. Pat. Nos. 4,657,680 and 4,698,163; and Murray et al. in U.S. Pat. No.5,112,499.

The industry and the inventors, despite such efforts, have not successfully eliminated the dependency of conventional wet-process phosphoric acid manufacturing upon acid pond water with its load of contaminants threatening pollution of adjacent air, soil, and water.

The present invention, while retaining benefits of the present inventors' identified joint invention, is directed to modifying the wet-process manufacturing of phosphoric acid with the result of substantially eliminating pollution attributable to conventional gypsum pond waters and minimizing the loss of $P_2O_5$ while doing so.

SUMMARY OF THE INVENTION

A primary object of the present invention is to supersede the contaminant-bearing acid gypsum pond water hitherto generated in the wet-process manufacturing of phosphoric acid with gypsum stack water that is substantially contaminant-free.

Another object of this invention is to reduce air and ground water pollution from wet-phosphate process acid gypsum pond water.

A further object of the invention is to limit water discharged into surface waters to decontaminated water of compatible pH.

Yet another object is to minimize $P_2O_5$ losses in the process of manufacturing wet-process phosphoric acid.

In general, the objects of the present invention are attained by providing new not-so-acidic process waters in place of conventional wet-process acid gypsum pond water, which is discontinued and is superseded. Such new acidic process waters result from aqueous collection of gaseous fluorides and entrained phosphoric acid, etc.

Circulating clean water with a pH of about 6 to 7 through conventional wet-process flash coolers and evaporators/condensers, and mopping up of $P_2O_5$ process leaks, spills, and wash liquids collects as an acid process water useful in preliminary washing of process gypsum filter cake. The resulting water is supplied via filter cake washing to the wet-process phosphoric acid reactor, thus recovering substantially all water-soluble $P_2O_5$ normally lost in conventional processing. Some of its fluosilicic acid reacts with phosphate rock therein, producing phosphoric acid, precipitating some fluorides, and reducing the consumption of sulfuric acid. This acid process water is contained in process tanks, pipelines, and like equipment, well segregated from contact with external air, soil, and water.

Scrubbing vent gases from the process reactor and other process equipment captures gaseous fluorides. Partially neutralized scrubber water at a pH of about 4 to 5—typically 4.5—and clarified is thereby freed of most fluorides and of other contaminants insoluble at that pH. This water is useful in part in wet-rock grinding at the head-end of the wet-process, and in other substantial part is alkalized to a pH of about 10.5 to 12—typically 11—freeing it of contaminants insoluble at this pH (but soluble at lower pH) and clarified, then re-acidified to a nearly neutral pH between 6 and 7.

The latter decontaminated pH-adjusted water (here called pH-AW) is non-scaling and is useful for such purposes as filter wash, scrubber water make-up, cooling tower water make-up, acid process water make-up, limestone slurrying, and lime slaking and slurrying.

Alternatively, pH-AW may be discharged to surface water after ascertaining that their respective pH's match reasonably closely.

Washed gypsum filter cake is slurried with recycled nearly neutral gypsum stack water and is partially neutralized as required to enable water draining from it when stacked, i.e., gypsum stack water (GSW), to have a pH of about 4.5 GSW is fed to the second or alkalizing stage to which first stage clarified scrubber water is fed and after clarification undergoes acidification to the same nearly neutral pH, between 6 and 7.

Other aspects of the present invention, together with means and methods for attaining the various objects, will be apparent from the following description and accompanying diagrams of preferred embodiments, which are presented by way of example rather than limitation.

SUMMARY OF THE DRAWINGS

FIG. 6 is a LEGEND, especially for FIGS. 1 to 4, emphasizing pH classification and iconic representation of the various flows.

Figure 1:
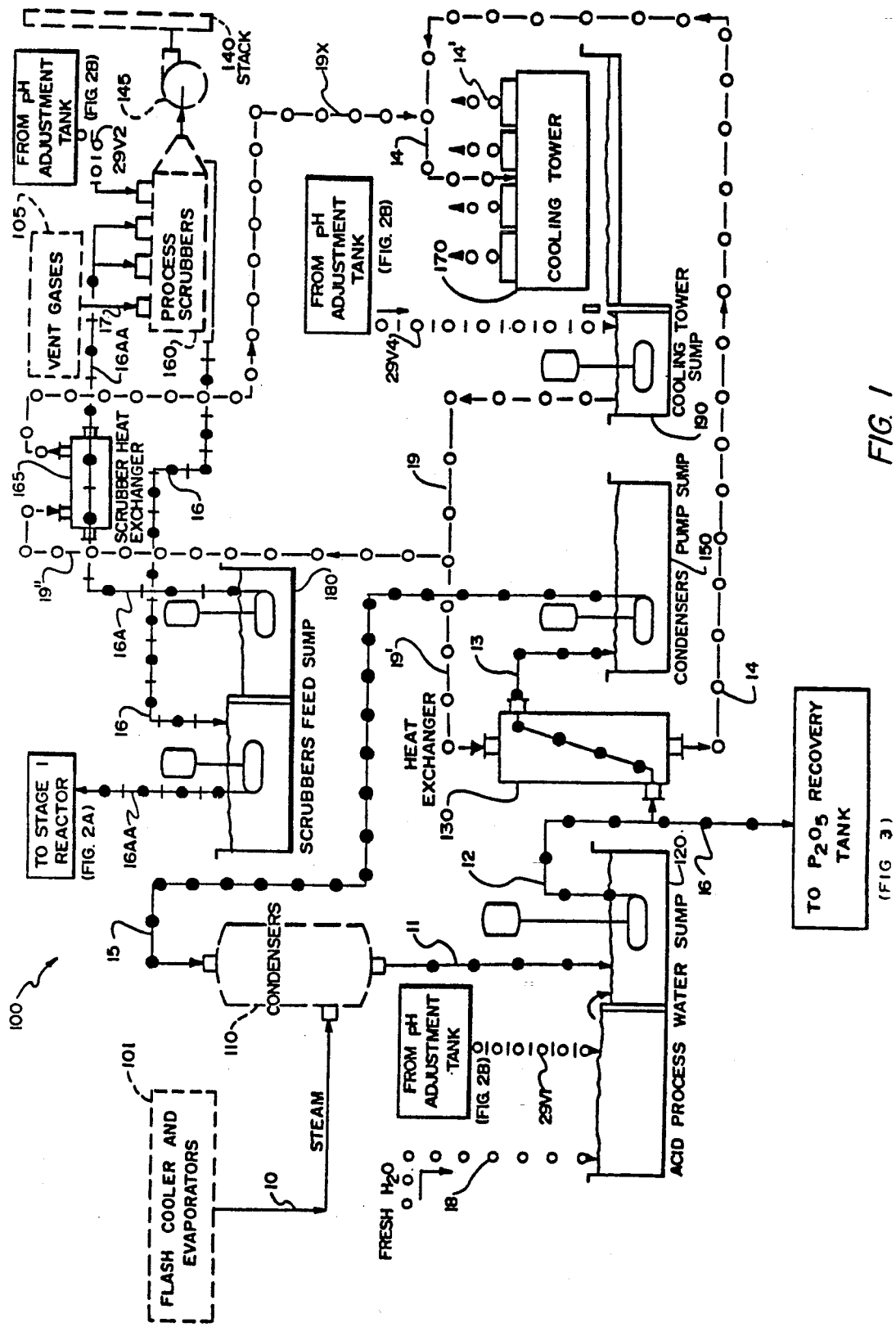
FIG. 1 is a first schematic diagram, featuring generation of acid process water and scrubber process water by this invention.

An item-by item description of FIGS. 1 to 4 precedes a description of the process as such, so as to minimize interruption of the diagram description by interjected process commentary—such as composition, concentration, phase, pH, and/or temperature—and to minimize reference characters in a subsequent process description.

In FIGS. 1 to 4, some existing components of the conventional wet-processing equipment are represented by dashed outline, whereas major components of the invention are shown with a solid outline in block or like schematic form. Equipment Components are identified by name and by 3-digit numbers, the first digit usually being the same as the FIG. number to aid identification.

Figure 2A:
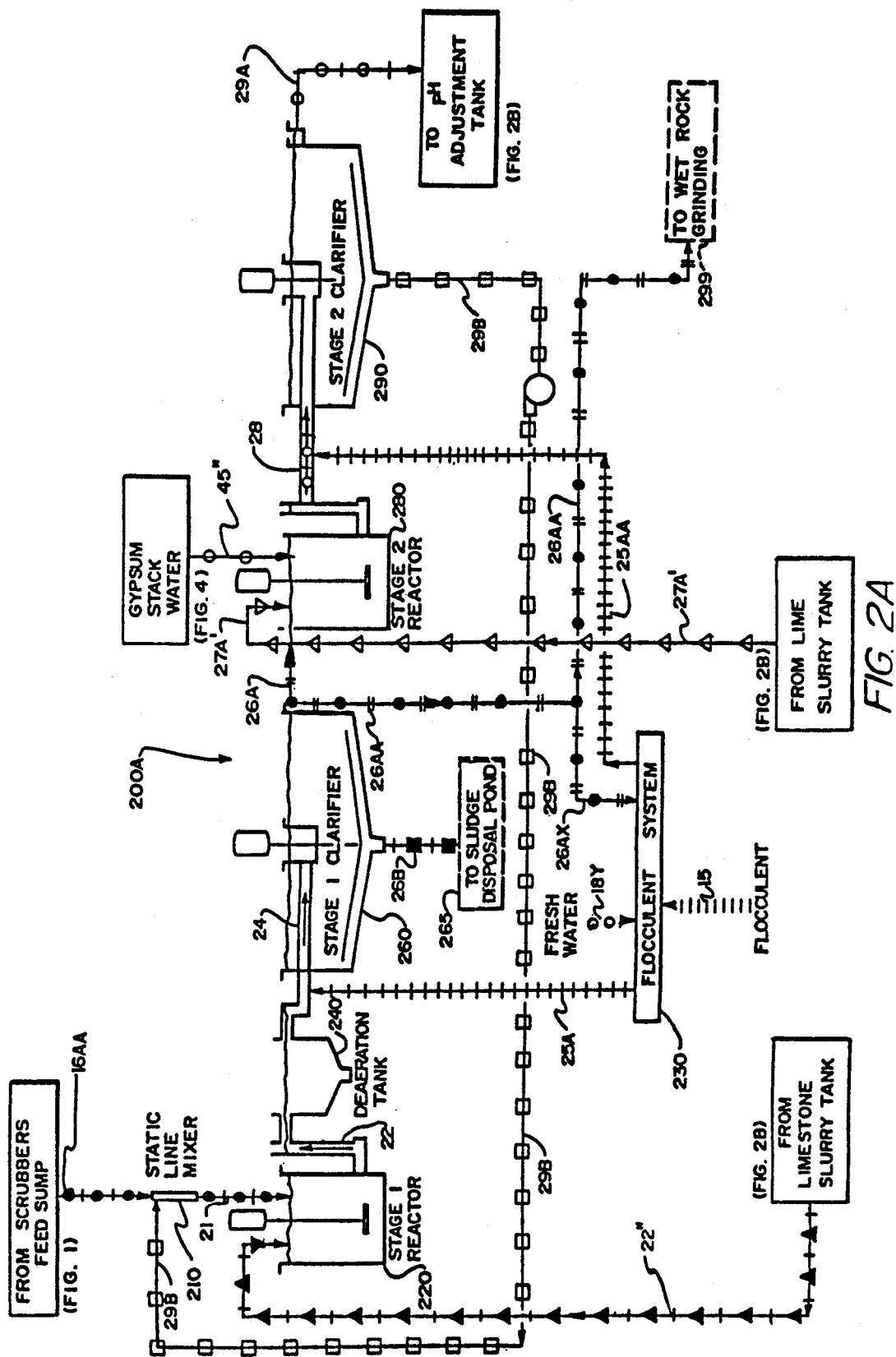
FIG. 2A is a part of a second schematic flow diagram, featuring two-stage neutralization and clarification, with scrubber process water in the first stage and gypsum stack water in the second stage, together with disposition of the respective overflow water and underflow sludges, according to this invention.
Figure 2B:
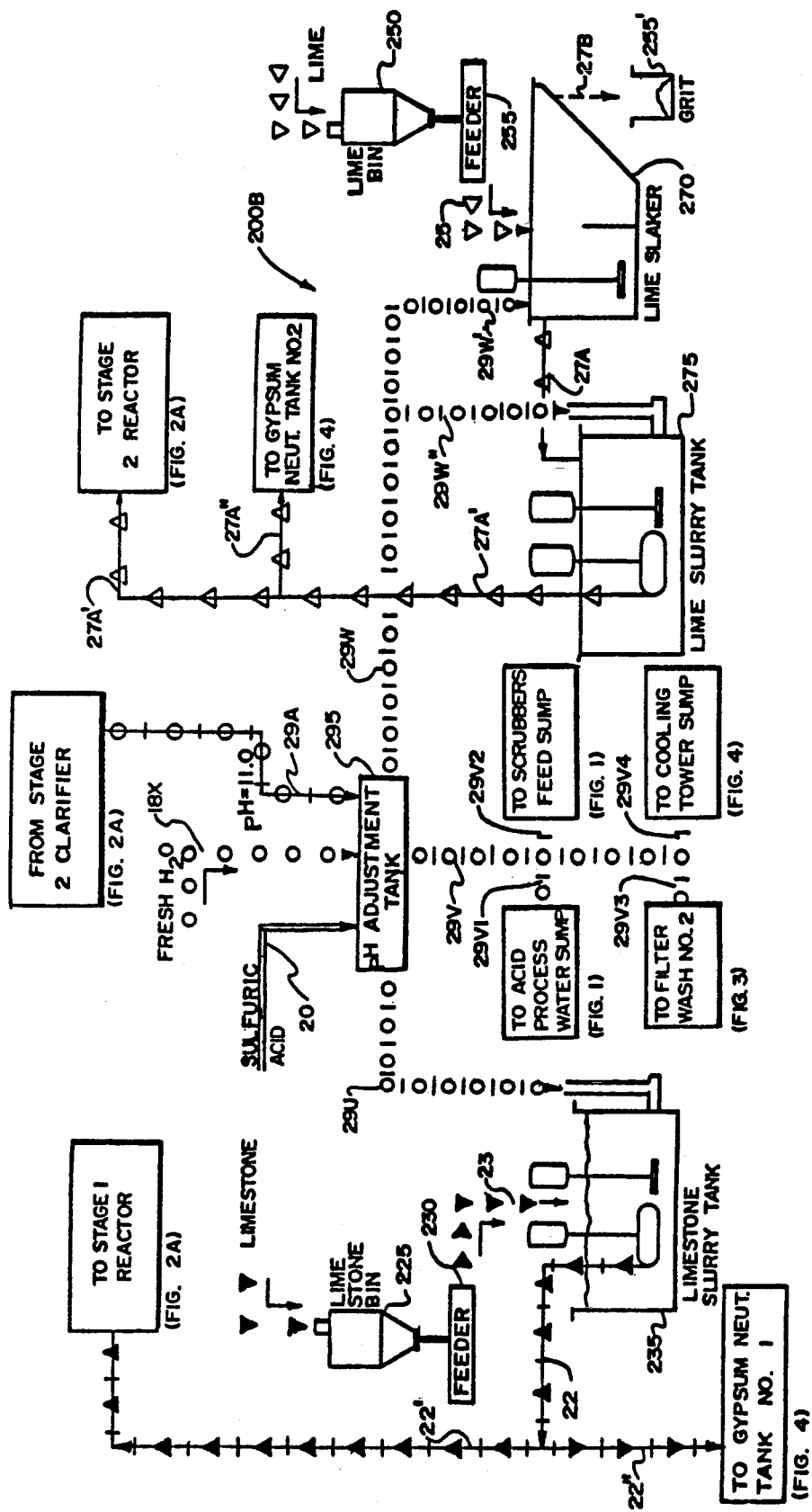
FIG. 2B is another part of such second schematic flow diagram, featuring limestone slurrying for the first stage and lime slaking and slurrying for the second stage, pH adjustment of the treated gypsum stack water, and distribution of pH-adjusted water, according to this invention.
Figure 3:
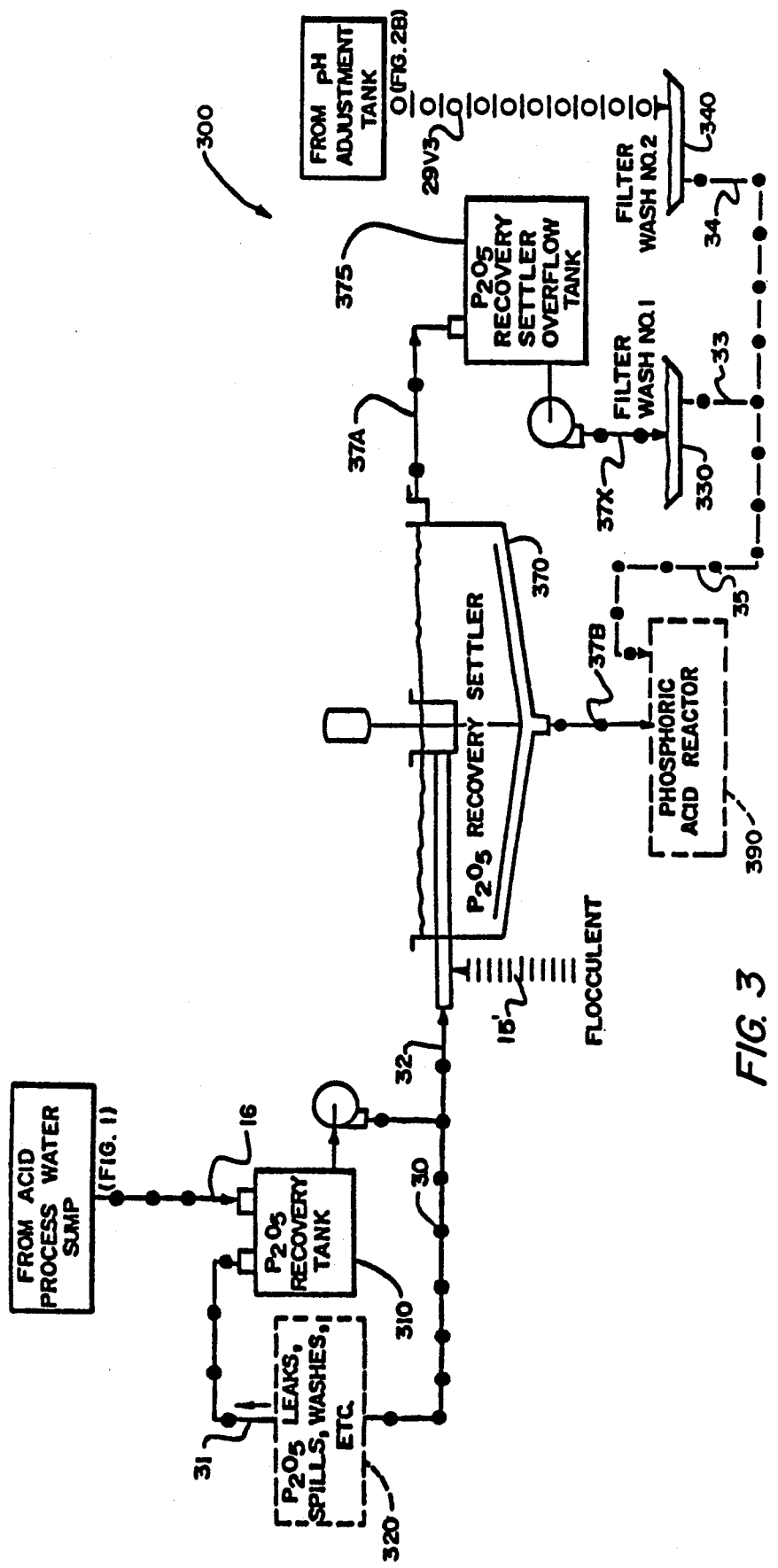
FIG. 3 is a third schematic diagram, featuring filter washes and phosphoric acid recovery according to this invention.
Figure 4:
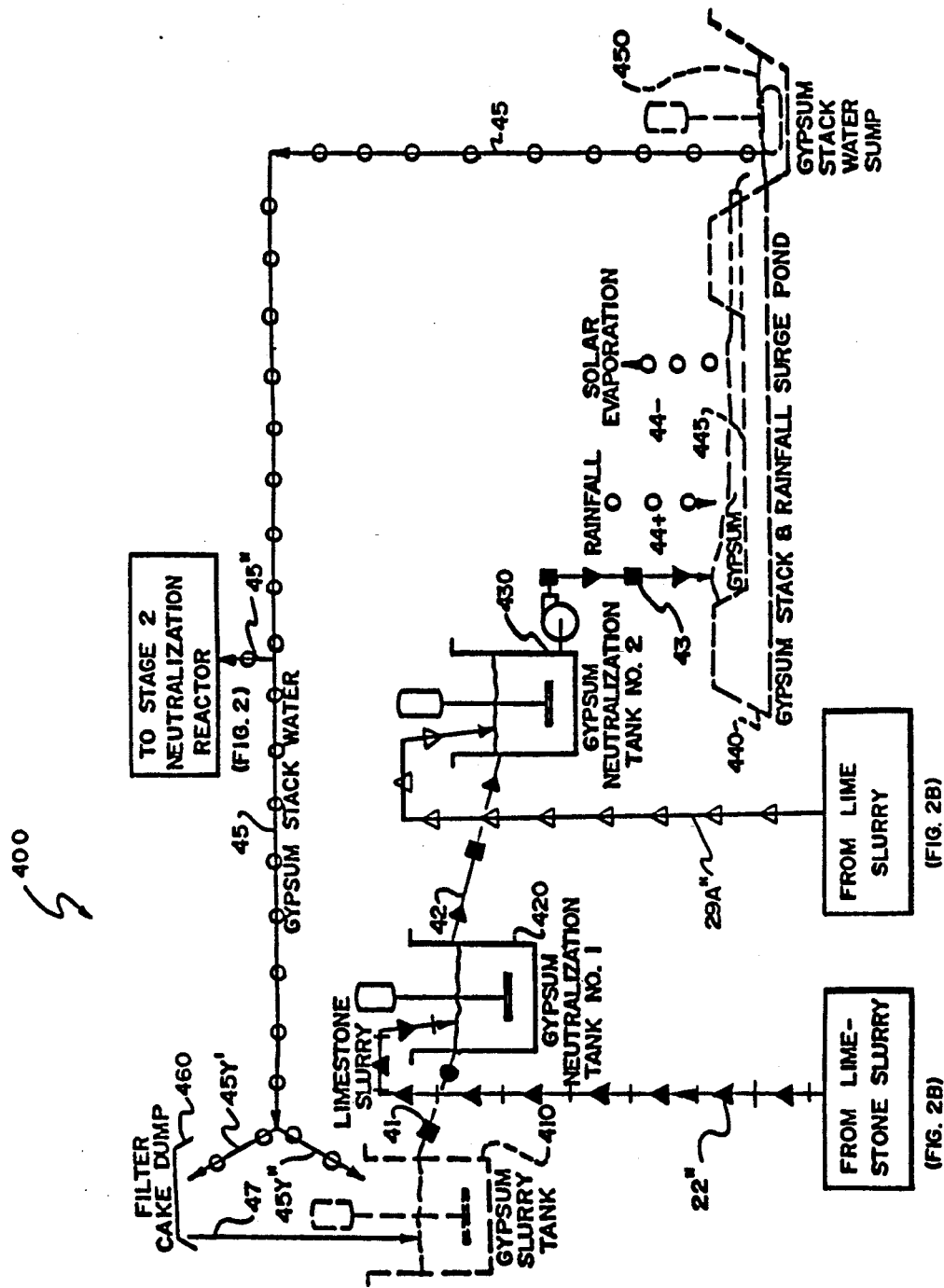
FIG. 4 is a fourth schematic flow diagram, featuring gypsum stack water generation and treatment by this invention.
Figure 5:
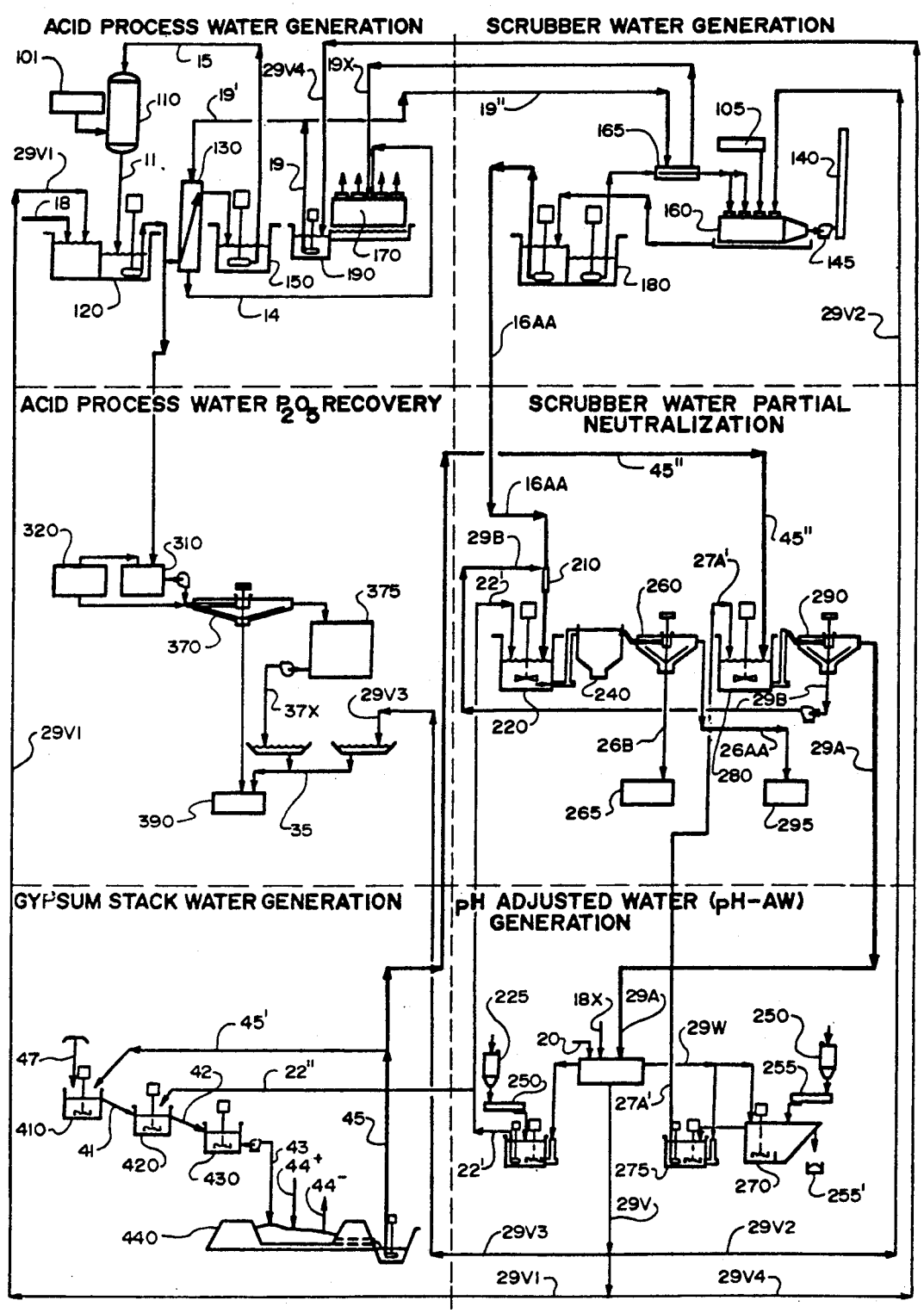
FIG. 5 is a composite schematic of the foregoing diagrams, with some rearrangement and simplification, enphasizing water flows.

FIG. 5 re-presents the foregoing diagrams (on reduced scale) in two columns of three boxes each (dashed lines), corresponding at the upper left and right to FIG. 1, at mid-right to FIG. 2A, at lower right to FIG. 2B, at mid-left to FIG. 3 and at lower left to FIG. 4.

Inflows and outflows shown by iconographic lines in the LEGEND of FIG. 6 are identified in FIGS. 1 to 5 by their respective interconnecting or transfer lines as two-digit numbers, usually the same as the first two digits of an interconnected component. Suffixes for two-digit numbers include A ("above") for overflows, and B ("below") for underflows, multiple where more than one; also X, Y, etc., for line extensions; and single or double primes for branches.

FIG. 6 provides a ready-reference diagrammatic guide to input and output water and other aqueous liquids, slurries, etc. under headings of <u>Description</u>, <u>Symbol</u> (iconographic), and <u>pH Level</u>.

The LEGEND is divided into five main horizontal sections, each comprising a number of rows under the identified headings. The row captions are Very Acidic (e.g., pH of 1.5–2) with five entries; Moderately Acidic (e.g., pH of 3.5–4.5) seven entries; Slightly Acidic (pH about 6) one entry; Neutral (pH about 7) three entries; and Very Alkaline (e.g., pH of about 11) four entries.

Very acidic entries include Sulfuric Acid, double line; Acid Process Water, single line beaded with filled circles; Scrubber Process Water, single line, with filled circles and alternate cross-hatching; Filter Wash Effluent, dashed line, filled circles; Gypsum Slurry, single line with alternate filled circles and squares.

Moderately Acidic entries are Partly Neutralized Scrubber Water, single line with filled circles and alternate double cross-hatching; Partly Neutralized Scrubber Water Underflow, single line with filled squares and alternate cross-hatching; Partly Neutralized Gypsum Slurry, single line with alternate filled squares and triangles; Flocculent, cross-hatching (without and with line); Limestone, filled triangles; Limestone slurry, single line with filled triangles and alternate cross-hatching; and Gypsum Stack Water, single line with open circles.

Slightly Acidic entry is pH-Adjusted Water, open circles and alternate cross-hatching.

Neutral entries are Fresh Water and Water Vapor, open circles (without line); Cooling Water, dashed line with open circles; and Steam (line only).

Very Alkaline entries are Over-Neutralized Gypsum Stack Water, single line with alternate open circles and cross-hatching; Over-Neutralized Gypsum Stack Water Underflow, single line with open squares; Lime, open triangles (no line); and Lime Slurry, single line with open triangles.

DESCRIPTION OF THE INVENTION

FIG. 1 shows schematically the first processing area, 100, of this invention. STEAM containing gaseous fluorides and entrained phosphoric acid from phosphoric acid manufacture is fed via line 10 from FLASH COOLERS & EVAPORATORS 101 (outlined in dashed lines) such as are common in phosphoric acid wet-process operations to CONDENSERS 110 (dashed outline indicating present in existing process), where it is collected as acid process water via line 11 (shown beaded with filled circles) in ACID PROCESS WATER SUMP 120. Such acid process water circulates in substantial part via line 12 through HEAT EXCHANGER 130 and via line 13 to CONDENSERS PUMP SUMP 150, from which it is recycled via line 15 back to the condensers, and is discharged via line 11 from the CONDENSERS into ACID PROCESS SUMP 120. A purge portion from the ACID PROCESS WATER SUMP branches from line 12 goes via line 16 to a $P_2O_5$ RECOVERY TANK in FIG. 3.

Also in FIG. 1 PROCESS SCRUBBERS 160 (dashed outline as process apparatus) receive VENT GASES 105 from elsewhere in the wet-processing. Blower 145 forces scrubber gases up and out of STACK 140 (similarly outlined) and into the surrounding atmosphere. The still warm scrubber discharge water returns via line 16 to SCRUBBERS FEED SUMP 180, from which a purge line 16AA goes to the the STAGE 1 REACTOR in FIG. 2A, while most of the water is recirculated via line 16A through Scrubber Heat Exchanger 165, from which cooled scrubber process water returns to PROCESS SCRUBBERS 160 via line 16AX.

The Scrubber Heat Exchanger receives cooling water from COOLING TOWER SUMP 190 via lines 19 and 19″. Warm cooling water returns via line 19X to COOLING TOWER 170. Makeup water from a pH-adjustment tank in FIG. 2B, is fed into COOLING TOWER SUMP 190 via line 29V4 on demand. Cooling water enters the top of HEAT EXCHANGERS 130 via line 19′, leaves via bottom line 14, and is pumped to the top of COOLING TOWER 170, in which it is cooled by evaporation (open circles 14′ with upward arrow), and from which it drains (downward arrow) to COOLING TOWER SUMP 190 and is recirculated through lines 19 and 19′to HEAT EXCHANGERS 130. Upon demand, makeup water from a pH Adjustment Tank (in FIG. 2B), is provided to the feed side of the ACID PROCESS WATER SUMP 120 via line 29V1, to the last stage of PROCESS SCRUBBERS 160 via line 29V3, and to the COOLING TOWER SUMP via line 29V4. Fresh makeup water may also be added via line 18 to the feed portion of the ACID PROCESS WATER SUMP, as during dry seasons.

FIGS. 2A and 2B show schematically a pair of second processing areas, 200A and 200B of this invention. In FIG. 2A, STAGE 1 REACTOR 220 receives via line 21 from STATIC LINE MIXER 210 Scrubber Process Water fed via line 16AA from SCRUBBERS FEED SUMP 180 in FIG. 1, and underflow slurry via line 29B from STAGE 2 CLARIFIER 290 downstream in this view. After reacting with each other, they react with limestone slurry in STAGE 1 REACTOR 220 supplied via line 22″ from LIMESTONE SLURRY TANK in FIG. 2B. The STAGE 1 REACTOR contents pass via line 22 to DEAERATION TANK 240 and via line 24 to STAGE 1 CLARIFIER 260. The underflow slurry from the clarifier is forwarded via line 26B to SLUDGE DISPOSAL POND 265 located elsewhere (broken outline). Overflow from the first clarifier goes in part via line 26A to STAGE 2 REACTOR 280, and in other part via lines 26A and 26AA to WET ROCK GRINDING 299, also indicated (broken lines) as located elsewhere.

Also in FIG. 2A, FLOCCULENT is received into flocculent system 230 from an external source via line 15 (cross-hatching only), and receives initial FRESH WATER diluent via line 18Y, and is further diluted by Stage 1 clarifier overflow water via line 26AX, whereupon diluted flocculent (cross-hatched line) is fed via line 25A to STAGE 1 CLARIFIER 260, and via line 25AA to STAGE 2 CLARIFIER 290.

Gypsum stack water (from FIG. 4) is fed via line 45″ to STAGE 2 REACTOR 280, in FIG. 2A, where it is mixed with overflow from STAGE 1 CLARIFIER 250 (line 26A) and reacted with lime slurry received via line 27A′ and then discharged via line 28 to STAGE 2 CLARIFIER 290. The underflow slurry from STAGE 2 CLARIFIER 290 is sent via line 29B to STATIC LINE MIXER 210, where it dissolves in the acidic scrubber water entering via line 16AA, and goes via line 21 with the rest of the mixer output to STAGE 1 REACTOR 220. Resulting clear overflow alkaline or over-neutralized gypsum stack water proceeds from STAGE 2 CLARIFIER 290 via line 29A to pH ADJUSTMENT TANK 295 (in FIG. 2B), where it is joined by pH-adjusting SULFURIC ACID from line 20 before being further used according to this invention.

At the left in FIG. 2B, LIMESTONE is fed into LIMESTONE BIN 225 and is discharged onto feeder 230, which forwards it via path 23 to LIMESTONE SLURRY TANK 235, into which water from pH-ADJUSTMENT TANK 295 is fed via line 29U. Almost all of the resulting limestone slurry is fed via line 22 and branch line 22, into neutralization STAGE 1 REACTOR 220 (FIG. 2A), raising the pH from below 2 to about 4½, while the rest is forwarded via branch line 22″ to GYPSUM NEUTRALIZATION TANK NO. 1 (420, FIG. 4). LIME is fed at right into LIME BIN 250 and via FEEDER 255 and path 25 to LIME SLAKER 270, where it is slaked with pH-adjusted water from line 29W′ branched from line 29W. Acumulating grit is removed via line 27B to grit collector 255′ to prevent equipment degradation. Lime slurry from the LIME SLAKER 270 overflows via line 27A into LIME SLURRY TANK 275, where it is diluted with pH-adjusted water via branch line 29W‴. The resulting diluted lime slurry is fed via line 27A′ to STAGE 2 REACTOR 280 (FIG. 2A) and branch 27A″ to GYPSUM NEUTRALIZATION TANK No. 1 in FIG. 4.

In pH ADJUSTMENT TANK 295 of FIG. 2B, the pH of the over-neutralized Gypsum Stack Water received from the Stage 2 Clarifier of FIG. 2A at a pH of about 11 is fed into pH ADJUSTMENT TANK 295, where by addition of Sulfuric Acid the pH is reduced, preferably to a slightly acidic pH of about 6 (nearly neutral). The output pH-Adjusted Water is then used as non-scaling process water in FIG. 1.

Such pH-AW uses in FIG. 1 include make-up to the acid process water sump via line 29V1, make-up to the scrubber feed sump via line 29V3, and make-up to the cooling tower via line 29V4. Another use for the pH-Adjusted Water is via line 29V2 in Filter Wash No. 2 (FIG. 3). Uses in limestone slurrying and lime slaking and slurrying have been already mentioned in description of this view (FIG. 2B). Fresh water is added via line 18X to pH ADJUSTMENT TANK 295 as for dry-season water balance.

FIG. 3 shows schematically a third processing area, 300, featuring $P_2O_5$ recovery. Warm acid process water from ACID PROCESS WATER SUMP 120 of FIG. 1 is fed via line 16 into $P_2O_5$ RECOVERY TANK 310. Overflow from the tank is circulated via line 30 for use on LEAKS, SPILLS, WASHES, ETC. 320 elsewhere. The resulting collected water is fed via line 31 to $P_2O_5$ RECOVERY TANK 310, and via line 32 to $P_2O_5$ RECOVERY SETTLER 370, which receives Flocculent via line 15′ and overflows via line 37A to $P_2O_5$ RECOVERY SETTLER OVERFLOW TANK 375. The underflow slurry is fed via line 37B to process PHOSPHORIC ACID REACTOR 390 (shown in dashed outline). Two FILTER WASH steps are shown, the first performed with warm acid process water from $P_2O_5$ RECOVERY SETTLER 370 via line 37X, and the second with pH-adjusted process water via line 29V3 from the pH-Adjustment Tank (FIG. 2B). Wash water from FILTER WASH NO. 1 (330) via line 33, and from FILTER WASH NO. 2 (340) via line 34, combine in line 35. After usage as one or more successive counter-current filter cake washes, the combined wash waters (as resulting No. 2 filtrate) then proceed to PHOSPHORIC ACID REACTOR 390 for dissolved $P_2O_5$ recovery.

FIG. 4 shows schematically the last processing area, 400, of this invention, utilizing a gypsum stack with a rainfall surge pond of a type usual in wet-process phosphoric acid manufacturing but now with important distinctions. Gypsum filter cakes from the plant's FILTER CAKE DUMP 460 via path 47 and recirculated gypsum stack water from GYPSUM STACK WATER SUMP 450 (shown in dashed outline) via sluice line 45Y' and slurry line Y" are mixed together in GYPSUM SLURRY TANK 410 (also in dashed outline). The resulting gypsum slurry proceeds to GYPSUM NEUTRALIZATION TANK NO. 1 (420), which receives LIMESTONE SLURRY via line 22" from the LIMESTONE SLURRY TANK in FIG. 2B. The reacted mixture then overflows via line 42 to GYPSUM NEUTRALIZATION TANK NO. 2 (430) and is further stabilized.

Lime slurry may also be added to increase the pH, if desired, via line 29A" in FIG. 2B. From the last tank, the resulting neutralized gypsum is spread via path 43 onto GYPSUM STACK 440, with adjacent RAINFALL SURGE POND 445. Both stack and pond receive water as RAINFALL (44+) and lose water to SOLAR EVAPORATION (44−). Overflow from the surge pond gathers in GYPSUM STACK WATER SUMP 450 and is recirculated via line 45 to sluicing gypsum cakes in FILTER CAKE DUMP 460 via branch line 45Y' and directly into GYPSUM SLURRY TANK 410 via branch line 45Y". Gypsum stack water required to make pH-AW goes via line 45" to STAGE 2 REACTOR 280 (FIG. 2A).

Phosphoric acid process waters generation, use, and treatment according to this invention are readily understood from the foregoing diagrams and their accompanying description, along with the more in the light of the operational information given below, especially with the aid of the all-encompassing diagrammatic view in FIG. 5. Prominent components and flow paths are re-presented therein and are described operationally below with a minimum of numerical references but with appropriate comment about conditions prevailing, or changes occurring, at various locations and times. It will be understood that two or more components and circuits, even most or all of them, combine as apparatus and method combinations that are much more than aggregations of individual parts or steps, even though one or more of them may be familiar to persons ordinarily skilled in the art.

According to this invention, acid process water and scrubber water and other makeup waters start with pH-adjusted water (pH-AW). This pH-AW is a pure (decontaminated) water prepared by treating gypsum stack water—obtained from filter cake water by neutralizing with limestone to a pH of about 4.5 (plus rainwater, or dry-season fresh water) and clarifying, then alkalizing with lime in the second-stage reactor to a pH of about 11, and clarifying, adjusting the pH of the resulting clear overflow to about 6, as with sulfuric acid. It is non-scaling and very low in impurities, such as about 2 ppm fluorides, 23 ppm $P_2O_5$, 97 ppm calcium, 25 ppm silicon dioxide and 500 ppm total dissolved solids.

Acid process water (APW) is generated from pH-AW and is used as a once-through water, for process makeup water in the wet-process phosphoric acid plant, while simultaneously recovering most of the miscellaneous $P_2O_5$ "losses" that occur in conventional processing.

In the APW condenser circuit, pH-AW is added to a circulating flow of APW. Steam from flash coolers and evaporators of a wet-process acid plant is condensed with circulating APW at about 35° C. (95° F.), thereby warming to about 50°–55° C. (about 85°–120° F.). The warm water is cooled in heat exchangers by a separate isolated circuit of cooling water recirculating from there to a cooling tower and back within a range of about 30° C. to about 50° C. (about 85° to 120°–125° F.). Cooling tower makeup water is pH-AW, non-scaling and compatible with cooling towers designed for fresh water use.

The APW absorbs substantially all gaseous fluorides evolved by the flash coolers and evaporators, as well as collecting entrained phosphoric acid. Concentrations are usually in the range of about 6000 to about 18000 (typically about 12000) parts per million (ppm) F as fluorides and a like amount of P as $P_2O_5$. A purge stream from the APW sump tank precludes accumulation above such concentrations—and is sent to the $P_2O_5$ recovery tank. APW in the tank is circulated to plant areas to recover $P_2O_5$ from spills and leaks, and is used for washdowns. A purge stream is withdrawn and is sent to the $P_2O_5$ recovery settler for removal of suspended solids to prevent blinding of the filter cake when washed with APW.

Solids-free APW is used for the first filter cake wash to provide about 60% of the process makeup water to the process and, in so doing, to recover about 80–85% of the miscellaneous $P_2O_5$ losses to the process. In contrast, conventional operations use acid pond waters to slurry the gypsum, which is dewatered and stacked. The phosphoric acid present in moisture in the stacked gypsum is thereby lost to the process. APW is very acidic, not having been treated with limestone or other neutralizing agent, and is non-scaling. In addition to increasing $P_2O_5$ recovery, some of the the fluosilicic acid in the APW going into the phosphoric acid reactor will react with the phosphate rock to produce phosphoric acid, removing the fluorides by precipitation, and saving on sulfuric acid usage.

Scrubber water is generated from pH-AW and totally used for its intended purpose, as a once-through water. The pH-AW is introduced into the last stage of the scrubbers and, by circulating around the process scrubbers, substantially absorbs all the gaseous fluorides—$P_2O_5$ content is negligible, especially in modern plants with wet-rock grinding. The scrubber heat exchanger, using cooling tower water, cools the scrubber water from about 100° F. to 95° F. for more efficient scrubbing. The recirculated scrubber rate to the scrubber is on the order of 25 to 35 gal per thousand cubic feet of gas. The fluoride content ranges from about 4,000 to 12,000 ppm F, depending upon the phosphate rock used, the manner in which the filter recycle acid and sulfuric acid are fed to the reactor, and the process used (i.e., dihydrate or hemi-hydrate). A purge stream is used to control fluoride concentration and is sent to the first-stage reactor for removal of fluorides.

According to this invention gypsum filter cakes from phosphoric acid plant operations undergo a first wash, with warm APW as noted. The first filter wash volume approaches about 1.4 displacements of the filter cake water. The second filter cake wash is performed with clear non-scaling pH-AW, wherein about one displacement wash volume of the filter cake water is effective to remove APW in the filter cake, thereby improving P₂O₅ recovery.

Approximately one percent of water-soluble $P_2O_5$ (lost in gypsum filter cake in the conventional phosphoric acid wet-process) is non-recoverable regardless of steps taken. The water from both washes is returned to the plant phosphoric acid reactor for $P_2O_5$ recovery, while the washed filter cake goes into the gypsum slurry tank.

Also fed to the gypsum slurry tank is gypsum stack water for slurrying the cake and washing the cake from the filter. The slurry from the gypsum slurry tank is thoroughly mixed and then is passed to the first gypsum neutralization tank, into which limestone slurry is fed from the limestone slurry tank to raise the pH to about 4.5, thereby precipitating fluorides, along with about 30–40% of the phosphates, and most of the heavy metals, and radium-226. This largely neutralizes weak acids in the gypsum, and the overflow proceeds to a second gypsum neutralization tank for stabilization time to complete the reaction so as to minimize scaling in the pipelines to the gypsum stack. As noted, lime slurry may be added to increase the pH.

The partly neutralized gypsum slurry is spread on the gypsum stack and so dewatered. Water drains from the gypsum stack into an adjoining rainfall surge pond, which increases in level thereby and from rainfall as it occurs—and also loses water by evaporation. A gypsum stack water sump receives the partially neutralized gypsum stack water (and rainfall) from the rainfall surge pond. The gypsum stack water from the sump is recirculated to the gypsum slurry tank and to the second-stage reactor for neutralization therein.

The partially neutralized gypsum stack water is distinguished from the usual gypsum stack pond water by its higher pH and substantial lack of phosphoric (and other) acid and of dissolved fluorides, as noted. Extensive (e.g., several-hundred-acre) conventional acid pond water cooling ponds, as now used with acid pond water in direct contact with the ground, are no longer environmentally acceptable and by the present invention are superseded. Some area is required for a rainfall surge pond, to prevent pond overflow during periods of heavy rainfall.

The process of this invention is balanced so that no material accumulates to excess and no required material depletes excessively. The operating cost is not penalized in achieving drastically increased environmental acceptability and actually is reduced through increased recovery of $P_2O_5$ and correspondingly decreased containment requirement for acids, heavy metals and radioactive compounds.

Preferred embodiments and variants have been suggested for this invention. Other modifications may be made, as by adding, combining, deleting, or subdividing compositions, parts, or steps, while retaining all or some of the advantages and benefits of the present invention—which itself is defined in the following claims.

We claim:

1. In wet-process phosphoric acid manufacturing productive of waste gypsum and water containing soluble fluorides, metal salts, and radioactive compositions as contaminants, wherein
   said waste gypsum was slurried and stacked for drainage into a pond of water, said drainage water having a pH of at most about 2 and containing said dissolved contaminants as well as residual phosphoric acid,
   the improvement comprising superseding the aforesaid acid gypsum pond drainage by slurrying waste gypsum with, and thereby limiting gypsum stack drainage to, water substantially freed of said dissolved contaminants and having a more nearly neutral pH of about 6 to 7.

2. The manufacturing improvement according to claim 1, wherein before gypsum slurrying and stacking, wet-process gypsum filter cake is washed last with water partially neutralized from a starting pH of at most about 2 and clarified with removal of precipitated contaminants in the underflow, then alkalized to a pH of at most about 12 and clarified with removal of precipitated contaminants in the underflow, and then re-acidified to a nearly neutral acidic pH.

3. The manufacturing improvement according to claim 2, wherein the pH of the partially neutralized water is about 4.5, and the pH of the alkalized water is about 11.

4. The manufacturing improvement according to claim 3, wherein re-acidified water is used also as make-up for other water usage in the wet-process manufacturing.

5. The manufacturing improvement according to claim 4, wherein the re-acidified water not otherwise used in the wet-process is discharged into ground water having a matching pH.

6. The manufacturing improvement according to claim 2, wherein the underflow from the partial neutralization and clarification is segregated as contaminated sludge.

7. The manufacturing improvement according to claim 6, wherein the underflow from the alkalization is recycled into water with a pH of at most about 2 before partial neutralization and clarification.

8. Modified wet-process manufacturing of phosphoric acid, wherein phosphate rock is reacted with sulfuric acid in a reactor and wherein by-product gypsum filter cake is washed repeatedly then is slurried and finally is stacked to drain, comprising
   forming separate process waters containing contaminants by condensing steam and other gases from wet-process flash coolers and evaporators, and by scrubbing wet-process vent gases;
   recovering $P_2O_5$ from process leaks, spills, and washes with one of the process waters, clarifying it, returning the underflow to the reactor, and preliminarily washing the gypsum filter cake with the clarified water; and
   raising the pH of the other process water, in a first stage toward neutral and in a second stage beyond neutral, clarifying it, removing precipitated contaminants in the underflows from both stages, re-acidifying the clarified water to nearly neutral pH about 6 to 7, and washing the wet-process by-product gypsum filter cake with the clarified re-acidified water.

9. Modified wet-process manufacturing of phosphoric acid, according to claim 8, including collecting gypsum stack drainage water and alkalizing it in the second stage before re-acidification.

10. Modified wet-process manufacturing of phosphoric acid, according to claim 8, wherein the underflow from the first stage is segregated as contaminant-containing sludge, and the underflow from the second stage is recycled to the first stage.

11. Modified wet-process manufacturing of phosphoric acid, according to claim 8, wherein over-all wet-process water-soluble $P_2O_5$ loss is limited to about one percent.

12. Method of producing by-product gypsum collected as filter cake, slurried, and stacked to drain in wet-process phosphoric acid manufacturing, substantially free of contaminants, comprising treating process water contaminated with dissolved fluorine, heavy metals, and radioactive compositions as well as residual $P_2O_5$, in a first stage of partial neutralization and clarification, including removing underflow containing, those of said precipitated contaminants insoluble at the pH to which partially neutralized, and in a second stage of alkalization and clarification, including removing underflow containing, remaining said precipitated contaminants soluble at the pH to which partially neutralized but insoluble at the pH to which alkalized, and in a stage of re-acidifying to nearly neutral pH about 6 to 7, producing a slightly acidic, non-scaling, pH-adjusted water (pH-AW).

13. Method according to claim 12, wherein the pH reached in the first stage is about 4.5, precipitating most fluorides and about one-third of the phosphates, and most heavy metals and radium-226.

14. Method according to claim 12, including reducing dissolved fluoride and fluosilicic content of the process water from a starting concentration of about ten thousand ppm to a final concentration of about two ppm.

15. Method according to claim 12, including reducing residual phosphoric acid content of the process water from a starting concentration of about twenty thousand ppm to a final concentration of about twenty ppm.

16. Method according to claim 12, including producing an acid process water from pH-AW while collecting condensed process steam and entrained phosphoric acid, and using the acid process water in preliminarily washing gypsum filter cake to be slurried and stacked.

17. Method according to claim 12, including using pH-AW in final washing of gypsum filter cake to be slurried and stacked, as well as make-up water elsewhere in the wet-process manufacturing.

18. Method according to claim 17, wherein the washed gypsum filter cake is slurried with water drained from the resulting stack.

19. Method according to claim 18, wherein water drained from the resulting gypsum stack and not used to slurry gypsum filter cake is sent to the second stage of alkalization and clarification.

20. Wet-process phosphoric manufacturing process modified by producing a decontaminated water as follows:

treating gypsum stack water obtained from filter cake water by partially neutralizing it with limestone to a pH of about 4.5 and clarifying it, then alkalizing the partially neutralized clarified water with lime to a pH of about 11 and clarifying it, and acidifying the alkalized clarified water to a pH of about 6 to 7, to yield a non-scaling pH-adjusted water and using the resulting pH-adjusted water in the wet-process in at least two of the following ways:

scrubbing wet-process vent gases, condensing steam from wet-process flash coolers & evaporators, washing wet-process by-product gypsum filter cake, as make-up water added where needed in the wet-process.

* * * * *